(12) United States Patent
Shin (10) Patent No.: US 8,954,119 B2
(45) Date of Patent: Feb. 10, 2015

(54) MOBILE DEVICE

(75) Inventor: Eui-Sub Shin, Yongin-si (KR)

(73) Assignee: Woojeon & Handan Co., Ltd (KR)

( * ) Notice: Subject to any disclaimer, the term of this patent is extended or adjusted under 35 U.S.C. 154(b) by 348 days.

(21) Appl. No.: 13/617,124

(22) Filed: Sep. 14, 2012

(65) Prior Publication Data

US 2013/0267282 A1 Oct. 10, 2013

(30) Foreign Application Priority Data

Apr. 4, 2012 (KR) ........................ 10-2012-0034804

(51) Int. Cl.
*H04M 1/00* (2006.01)
(52) U.S. Cl.
USPC ..................... 455/575.1; 455/550.1; 455/90.3
(58) Field of Classification Search
USPC .................................. 455/550.1, 575.1, 90.1
See application file for complete search history.

(56) References Cited

U.S. PATENT DOCUMENTS

| | | | | |
|---|---|---|---|---|
| 7,236,588 | B2 * | 6/2007 | Gartrell | 379/433.01 |
| 8,798,690 | B2 * | 8/2014 | Cho et al. | 455/575.1 |
| 2002/0065054 | A1 * | 5/2002 | Humphreys et al. | 455/90 |
| 2009/0291709 | A1 * | 11/2009 | Lee et al. | 455/556.2 |
| 2012/0115551 | A1 * | 5/2012 | Cho et al. | 455/566 |
| 2013/0220841 | A1 * | 8/2013 | Yang | 206/37 |

* cited by examiner

*Primary Examiner* — Fayyaz Alam
(74) *Attorney, Agent, or Firm* — Schmeiser, Olsen & Watts, LLP (57) ABSTRACT

A moisture-proofing mobile device which is formed with a variously colored silicon skin, through dual injection molding, integrally over a region that includes an engagement part of the bottom casing with the top casing, clamping screw holes, and a battery mounting part, which may selectively include an antenna part, a camera part or a button part is provided. In accordance with the disclosed embodiments, there is no concern about malfunction or trouble of the mobile device even when the mobile device is used in a humid place, such as a kitchen, a bathroom, a swimming pool or a waterside, and the mobile device may provide a smooth and excellent grip feeling of a non-slip property, and may exhibit an improved impact resistance.

9 Claims, 11 Drawing Sheets

MOBILE DEVICE

BACKGROUND

1. Field of Technology

The following relates to a mobile device. More particularly, the following relates to a moisture-proofing mobile device which is formed with a dual injection-molded silicon layer over a region that includes an engagement part of a bottom casing with a top casing, a clamping hole, and a battery mounting part, and may selectively include an antenna part, a camera part and/or a button part, such that there is no concern about malfunction or trouble of the mobile device even when the mobile device is used in a humid place, such as a kitchen, a bathroom, a swimming pool or a waterside, and the mobile device may provide a smooth and excellent grip feeling of a non-slip property, and exhibit an improved impact resistance.

2. Background

As generally known in the art, the term, "mobile device," is used to refer to all kinds of portable electronic devices, such as a mobile phone (feature phone), an MP3 (MPEG (Moving Pictures Experts Group)-1 Audio Layer-3), a PMP (Portable Media Player), a PDA (Personal Digital Assistant), a laptop notebook computer, a mini notebook computer, a UMPC (Ultra-Mobile Personal Computer), a tablet PC, a smart phone, a navigation system adapted to be cradled in a vehicle, a portable game machine, such as a PSP (Play Station Portable), and an electronic dictionary.

Among the above-mentioned mobile devices, a smart phone, in which a portable phone function and a PDA function are converged, has diversified functions, such as a network function and a scheduler function of a PDA, a personal information management function, and an internet information search function through Wi-Fi, beyond a telecommunication function of an existing portable phone function centered around a voice communication. Such a smart phone enables a user to conduct image communication and image transmission, to enjoy music through a MP3 function, and to enjoy moving picture broadcasting contents through a DMB function, as well as to conduct voice communication through a portable terminal function. Furthermore, the smart phone enables the user to enjoy a game or to download a novel or a cartoon as well as to use a navigation function though a GPS function. Due to the surprising convenience and diversified functions, the smart phone market has grown approximately 13% or more a year even in the global economic downturn period, and the smart phones have turned themselves into the center of mobile devices.

The smart phone may be variously defined. However, the smart phone may typically be defined as a composite mobile device in that the smart phone incorporates a higher operating system (OS) in addition to a voice phone function, may incorporate and operate a third-party application, and enables the use of the Internet. As being improved to have a high performance and a high density integration, the smart phone tends to be more highly sensible.

Today, a considerable number of smart phone users more and more frequently use a smart phone in a humid environment, such as a bathroom or a kitchen without placing the smart phone out of her or his hands. As a result, the smart phone may also be caused to malfunction or breakdown more frequently due to the penetration of moisture or water.

A typical moisture-proofing structure for a feature phone is disclosed in Korean Patent No. 10-0546965 (registered on Jan. 20, 2006), in which a dual injection-molded water-proofing ring 31' is generally interposed between a top casing 20' and a bottom casing 10', as illustrated in FIG. 11. Somewhat differently from this construction, a water-proofing packing may be formed only in the fastening part between the top casing 20' and the bottom casing 10' to prevent the water-proofing ring 31' from being exposed to the outside.

However, many kinds of recently available smart phones are provided, on the rear side thereof, with a rear cover formed from a thin metal or resin sheet, and a plurality of clamping screw holes, an antenna and/or a camera are positioned on the outer surface of a bottom casing below the rear cover. Therefore, the smart phones are very poor in water-proofing and moisture-proofing. Accordingly, when such a smart phone is laid on a moist or watery surface, moisture or water may easily penetrate into the smart phone from the rear side of the bottom casing through a fastening clearance of the rear cover, thereby causing the malfunction or trouble of the smart phone. Consequently, the conventional moisture-proofing structure alone is not sufficient for the moisture-proofing of a mobile device.

In addition, when the water-proofing ring as described above is used which is fabricated as a separate component rather than being formed through dual injection molding, the material cost may be increased as the number of components as well as the number of fabrication steps are increased.

Meanwhile, a body housing of a conventional mobile device has a problem in that the body housing is poor in grip feeling and impact resistance since it is formed from a hard plastic material, such as polycarbonate (PC) or polypropylene (PP).

In order to solve this problem, a number of smart phone users buy and use a separate bumper case configured to enclose four lateral sides of a smart phone. Such a bumper case is typically formed by dual injection molding of soft silicon and hard polycarbonate.

SUMMARY

Accordingly, the present disclosure has been made to solve the above-mentioned problems occurring in the prior art, and an aspect of the present invention is to provide a mobile device which can efficiently prevent the penetration of moisture or water through a battery storage part, a plurality of clamping screw holes, an antenna or camera mounting part, or the like to remove concern about malfunction or trouble of the mobile device.

Another aspect of the present disclosure is to provide a mobile device which can efficiently prevent the penetration of moisture or water even when the mobile device is laid on a moist or watery surface from carelessness.

Another aspect of the present disclosure is to provide a mobile device has a smooth and excellent grip feeling of a non-slip property even when a separate bumper case is not provided.

Yet another aspect of the present disclosure is to provide a mobile device with an improved impact resistance even when a separate bumper case is not provided.

Still another aspect of the present disclosure is to provide a mobile device, in which a silicon skin having the moisture-proofing property and improved impact resistance as described above is formed integrally with the bottom casing of the mobile device through dual injection molding, thereby enabling the mobile device to be excellent and superior in assemblability and productivity.

In accordance with an aspect of the present disclosure, In order to accomplish this object, there is provided a mobile device including: a top casing having a display window, one or more screw holes, a recess, and a fastening ridge; a bottom casing having a fastening groove engaged with the fastening ridge of the top casing, and a protrusion inserted into the recess, the bottom casing having an outer surface on which a concave part, in which a battery is mounted and one or more screw seating parts are formed; a silicon skin formed by a lateral side skin formed over four lateral sides of the bottom casing, a fastening part skin extending from the lateral side skin and formed in the fastening groove, a cover skin formed to cover at least the inner surfaces of the concave part and each of the screw seating parts, the silicon skin being formed integrally with the bottom casing; and one or more clamping screws fastened to the screw seating parts of the bottom casing and the screw holes of the top casing to fasten the top and bottom casings to each other.

In accordance with an exemplary embodiment of the present disclosure, a battery cover having a fastening part may be mounted on the concave part of the bottom casing, and the concave part of the bottom casing may be formed with a mounting groove into which the fastening part of the battery cover is inserted.

In accordance with another exemplary embodiment, the mobile device may be provided with an antenna on the outer surface of the bottom casing, and the silicon skin may further include an antenna skin configured to integrally cover at least the outer peripheral edges of the antenna.

In accordance with another exemplary embodiment, the mobile device may be provided with a camera part on the outer surface of the bottom casing, and the silicon skin may further include a camera skin configured to integrally cover the outer peripheral edges of the camera part.

In accordance with yet another exemplary embodiment, the mobile device may further include a thin rear cover mounted on the surface of the bottom casing.

In accordance with yet another exemplary embodiment, the silicon skin, which is formed by the lateral side skin, the fastening part skin, the cover skin, and the screw hole skins, may be formed integrally and continuously to cover the entirety of the outer surface of the bottom casing except the bottom surface of the concave part in which a battery is mounted.

In accordance with yet another exemplary embodiment, the lateral side skin and the fastening part skin may be integrally and continuously formed, but the cover skin and the screw hole skins may be discontinuously and independently formed.

In accordance with still another exemplary embodiment, the outer surface of the fastening part skin may be formed in a convex, concave or flat shape, and the end of the fastening ridge of the top casing may be formed in a concave, convex or flat shape.

In accordance with still another exemplary embodiment, the cover skin configured to cover at least the inner surface of the concave part may be formed with an uplift part to compress the fastening part of the battery cover.

In accordance with the present disclosure, the penetration of moisture or water through a battery storage part, a plurality of clamping screw holes, an antenna mounting part, a camera mounting part, or the like can be efficiently prevented. As a result, it is possible to remove concern about malfunction or trouble of the mobile device, and to efficiently prevent the penetration of moisture or water into the mobile device even when the mobile device is laid on a moist or watery surface from carelessness. In addition, it is also possible to provide a mobile device has a smooth and excellent grip feeling of a non-slip property and an improved impact resistance even when a separate bumper case is not provided. Moreover, as a silicon skin having the moisture-proofing property and improved impact resistance is formed integrally with the bottom casing of the mobile device through dual injection molding, the inventive mobile device is excellent and superior in assemblability and productivity.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

In the present disclosure, the term "mobile device" is defined to cover all kinds of portable electronic devices, such as a smart phone, a feature phone, an MP3 player, a PMP, a PDA, a laptop notebook computer, a mini notebook computer, a UMPC, a tablet PC, a navigation system, a portable game machine, an electronic dictionary, and may be used to specifically refer to a smart phone.

Now, the present invention will be described in detail with reference accompanying drawings.

Figure 1:
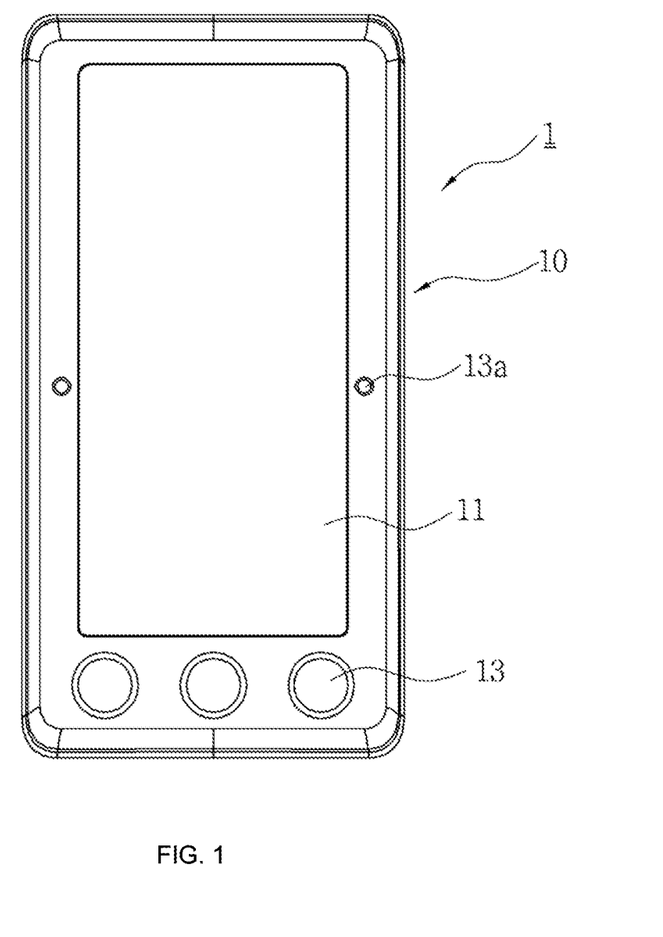
FIG. 1 is a front view exemplifying a mobile device in accordance with an exemplary embodiment of the present invention.
Figure 2:
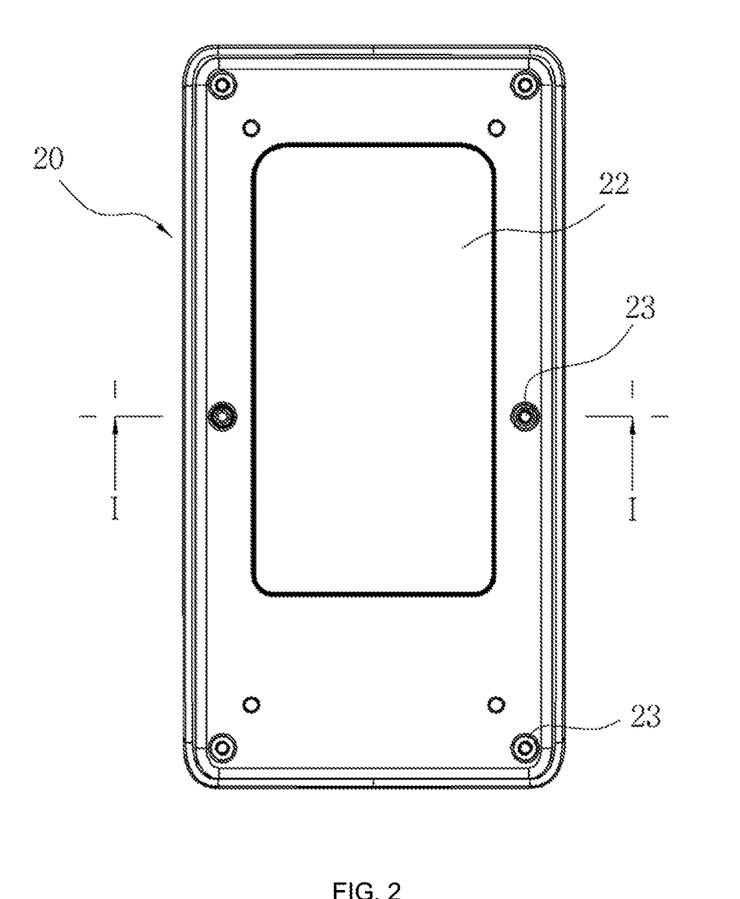
FIG. 2 is a bottom view of the mobile device of FIG. 1 in a state where the rear cover of the mobile device is removed.
Figure 3:
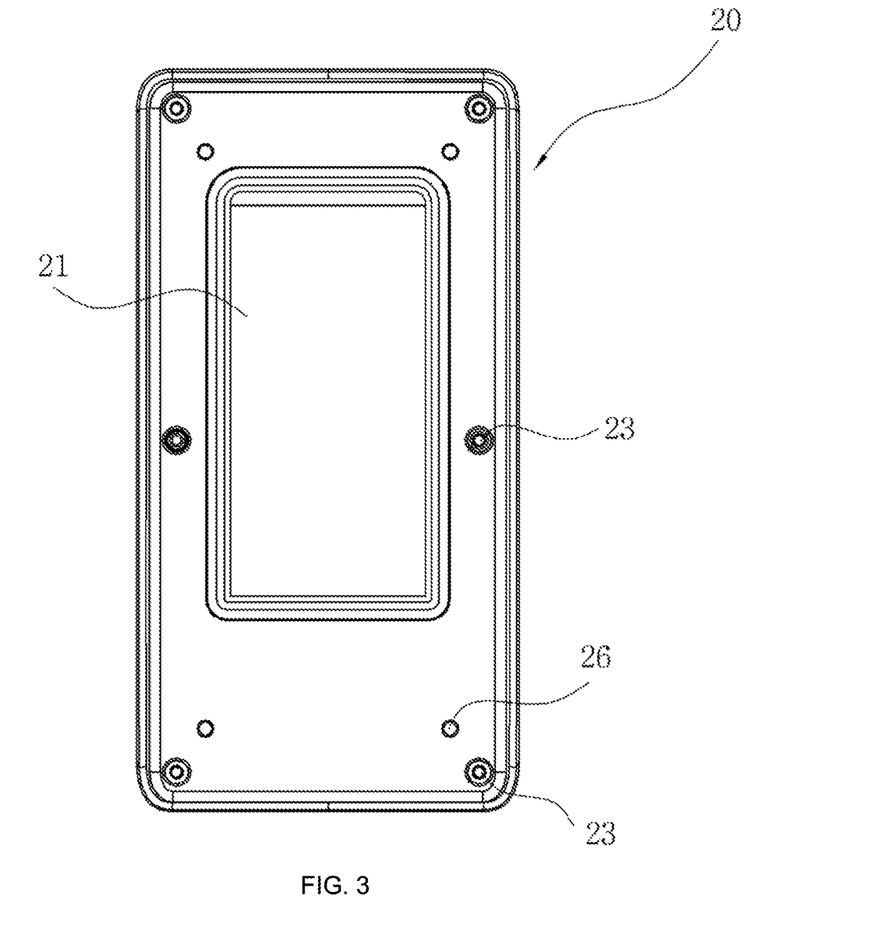
FIG. 3 is a bottom view of the mobile device of FIG. 2 in a state where the battery cover of the mobile device is removed.
Figure 4:
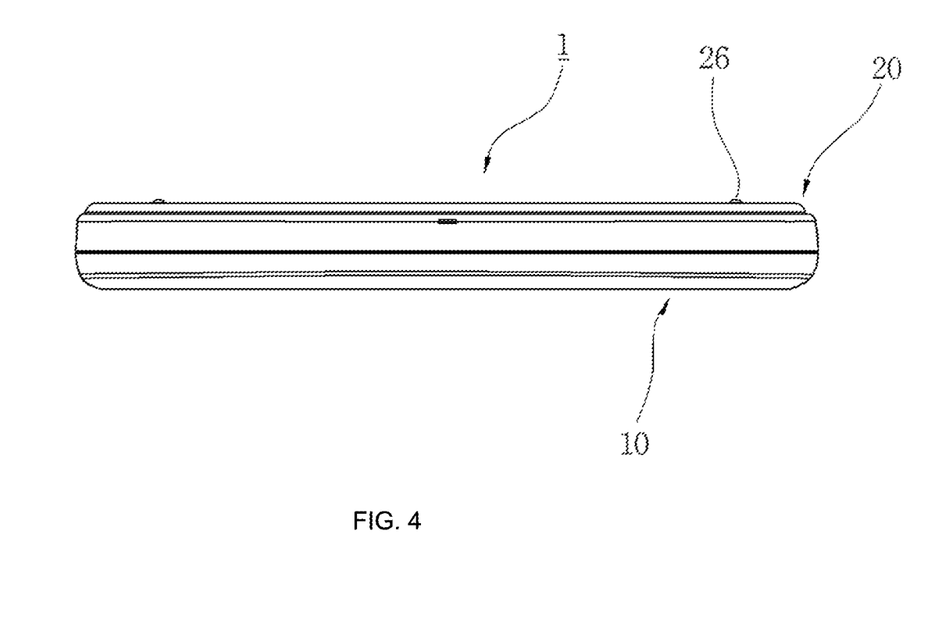
FIG. 4 is a side view of FIG. 1.
Figure 5A:
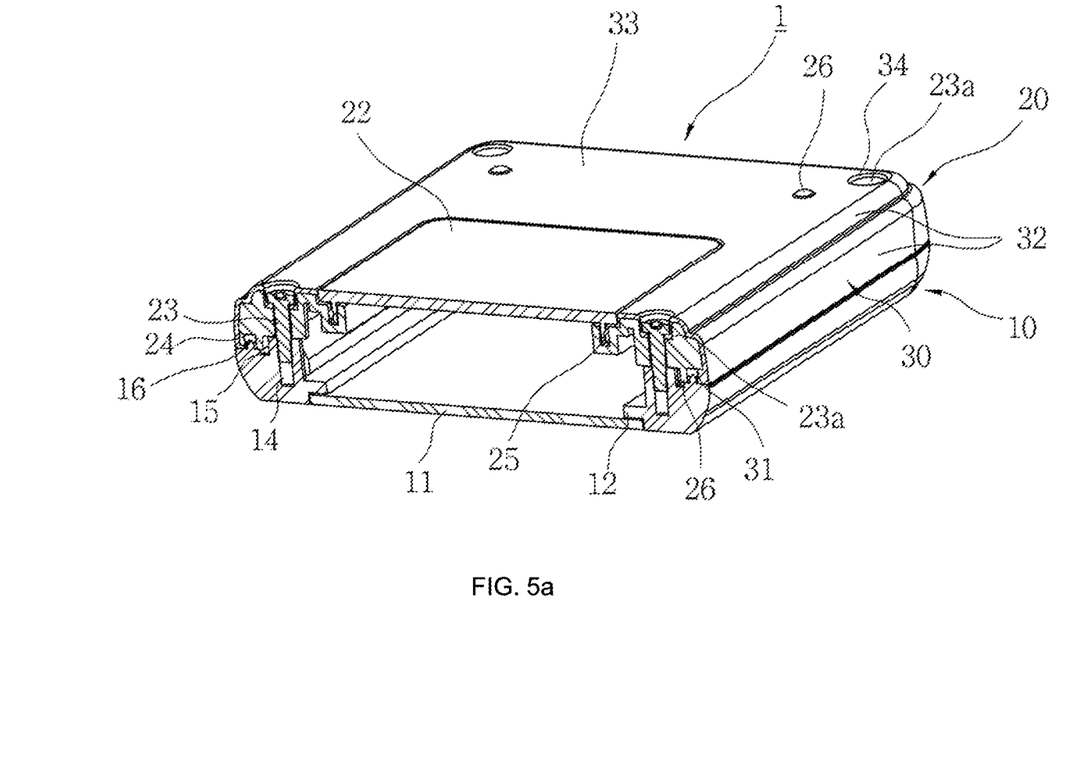
FIG. 5a is a perspective cross-sectional view along the line I-I in FIG. 2.
Figure 5B:
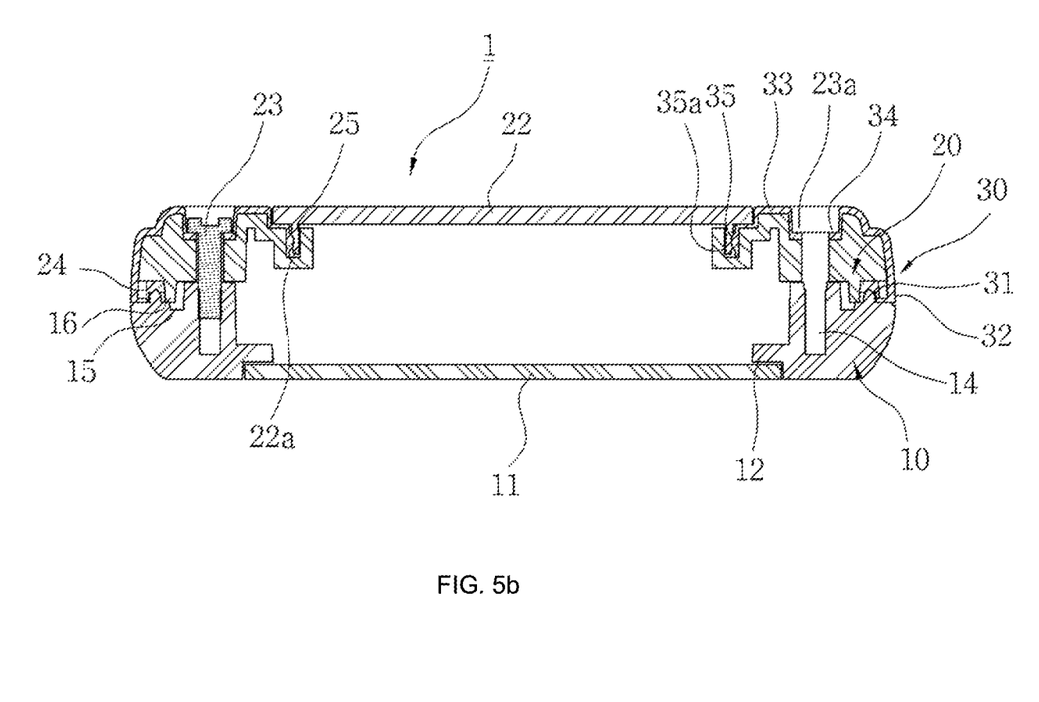
FIG. 5b is a cross-sectional view along the line I-I in FIG. 2

FIG. 1 is a front view exemplifying a mobile device 1 in accordance with an exemplary embodiment, FIG. 2 is a bottom view of the mobile device 1 of FIG. 1 in a state where the rear cover of the mobile device 1 is removed, and FIG. 3 is a bottom view of the mobile device 1 of FIG. 2 in a state where the battery cover 22 of the mobile device is removed. FIG. 4 is a side view of FIG. 1, and FIGS. 5a and 5b are a perspective view partially in cross-section and a schematic cross-section, each of which illustrates the sectioned part taken along the line I-I in FIG. 2. For the convenience of description, all the drawings are referred to together.

As exemplified, the basic construction of the mobile device 1 in accordance with an exemplary embodiment of the present invention includes: a top casing 10 having a display window 11 and buttons 13 and 13a or a touch type operating part; a bottom casing 20 fastened to the top casing 10, and formed with a concave part 21 configured to mount a battery, and a plurality of screw seating parts 23a on the outer surface thereof; a silicon skin 30 including a lateral side skin 32 formed on the four lateral sides of the bottom casing 20, a fastening part skin 31 extending from the lateral side skin 32 and formed between the top casing 10 and the bottom casing 20, and a cover skin 35 and a screw hole skin 34 configured to at least cover the inner surfaces of the concave part 21 and each of the screw seating parts 23a, respectively, the silicon skin 30 being formed integrally with the bottom casing 20, wherein clamping screws 23 are fastened to the screw seating parts 23a of the bottom casing 20 and screw holes 14 of the top casing 10 to rigidly fasten and clamp the top casing 10 and the bottom casing 20.

The fastening structure between the top casing 10 and the bottom casing 20 is not limited to the exemplified construction, and may have various forms and constructions. In the illustrated embodiment, a recess 15 and a fastening ridge 16 are formed along the bottom side of the peripheral edges of the top casing 10, and a fastening groove 24 corresponding in position to and engaged with the fastening ridge 16 of the top casing 10 and a protrusion 26 inserted into the recess 15 are formed along the top side of the peripheral edges of the bottom casing 20. The fastening part skin 31 is integrally formed in the fastening groove 24 of the bottom casing 20 through dual injection molding to prevent moisture or water from penetrating into a fastening clearance between the top casing 10 and the bottom casing 20.

In the exemplified embodiment, the silicon skin 30 is formed by the fastening part skin 31, the lateral side skin 32 integrally extending from the fastening part skin 31 to provide a good gripping feeling and impact resistance, a bottom side skin 33 integrally extending from the lateral side skin 32 and configured to cover the bottom area of the bottom casing 20, except the outer surface of the battery cover 22, and the cover skin 35 and the screw hole skin 34 integrally extending from the bottom side skin 33 and configured to cover at least the inner surfaces of the concave part 21 and each of the screw seating parts 23a.

However, in the present invention, the fastening part skin 31 and the lateral side skin 32 may be integrally formed with each other, and the cover skin 35 and the screw hole skin 34 may be separately and individually formed without forming the bottom side skin 33. Occasionally, the fastened skin 31 and the lateral side skin 32 may also be separately and individually formed in a non-connected discontinuous form, which also belongs to the scope of the present invention.

Figure 7:
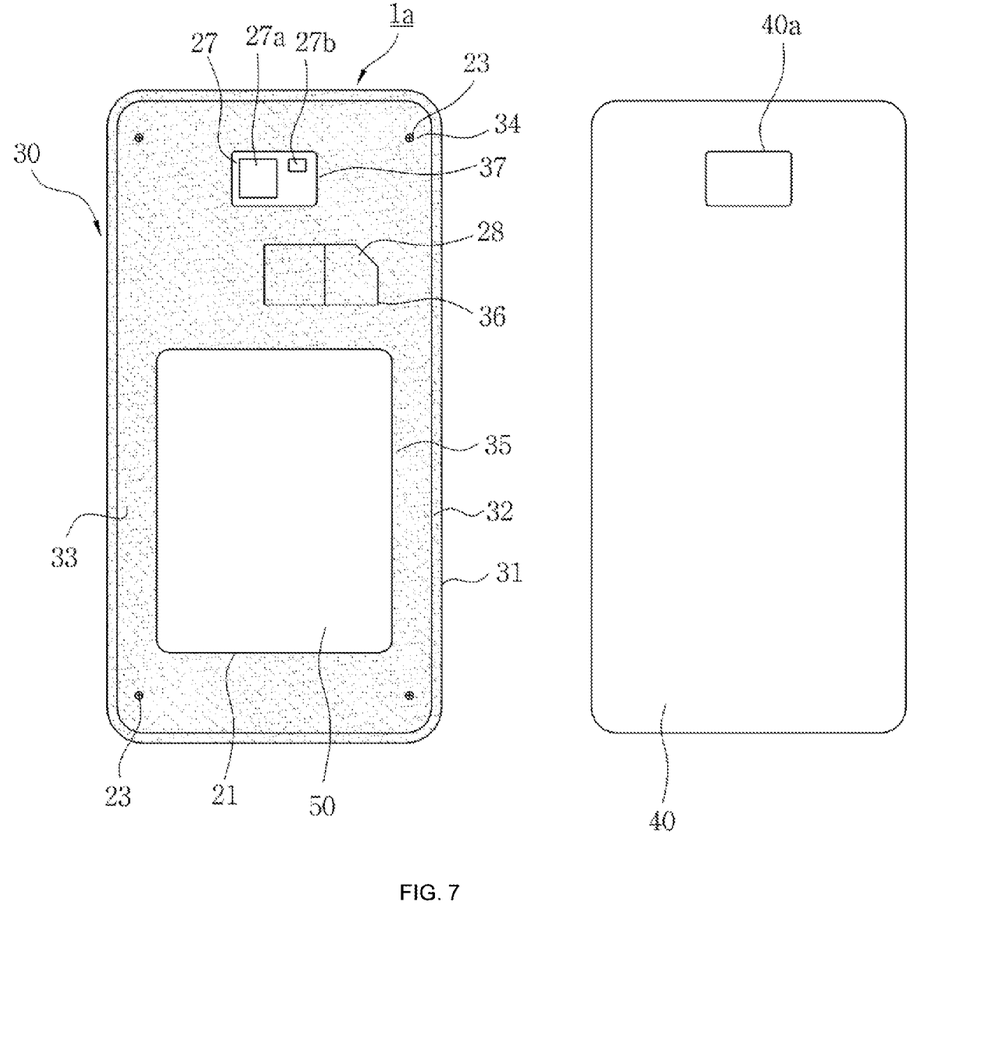
FIG. 7 is a bottom view exemplifying a mobile device in accordance with another exemplary embodiment of the present invention in a state where the rear cover is detached.
Figure 8:
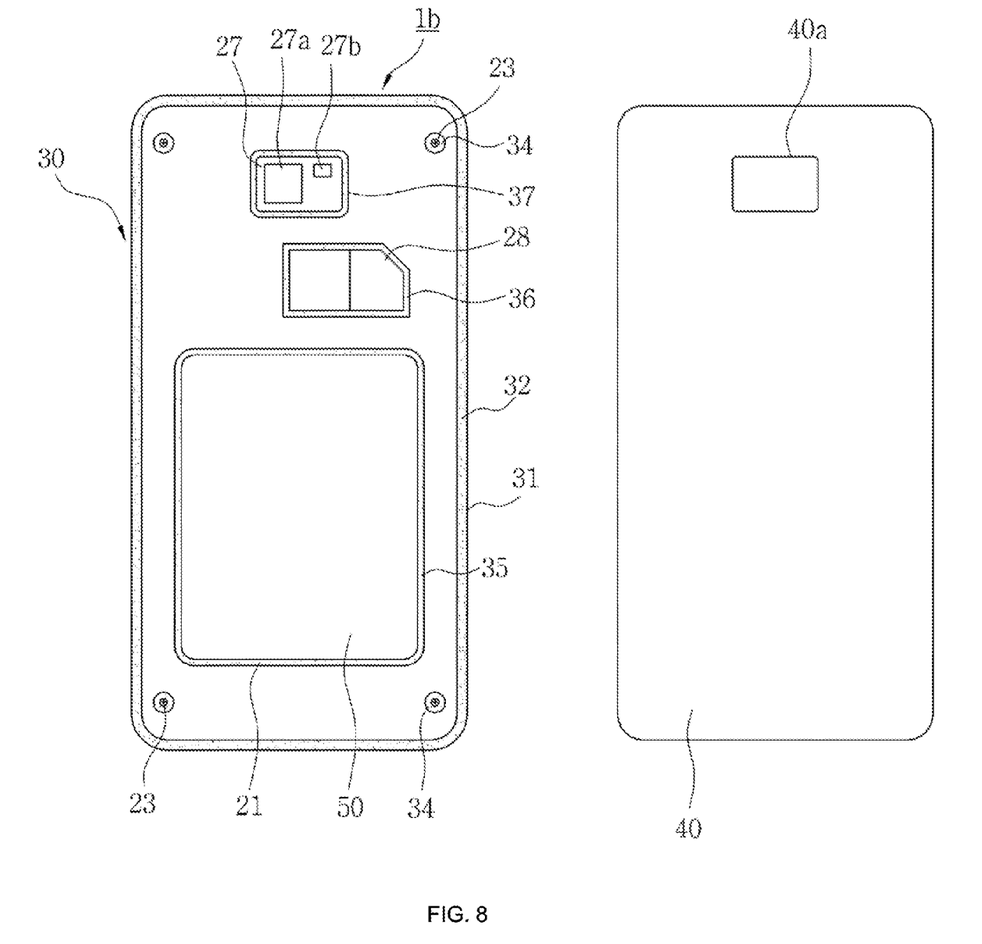
FIG. 8 is a bottom view exemplifying a mobile device in accordance with another exemplary embodiment of the present invention in a state where the rear cover is detached.
Figure 9:
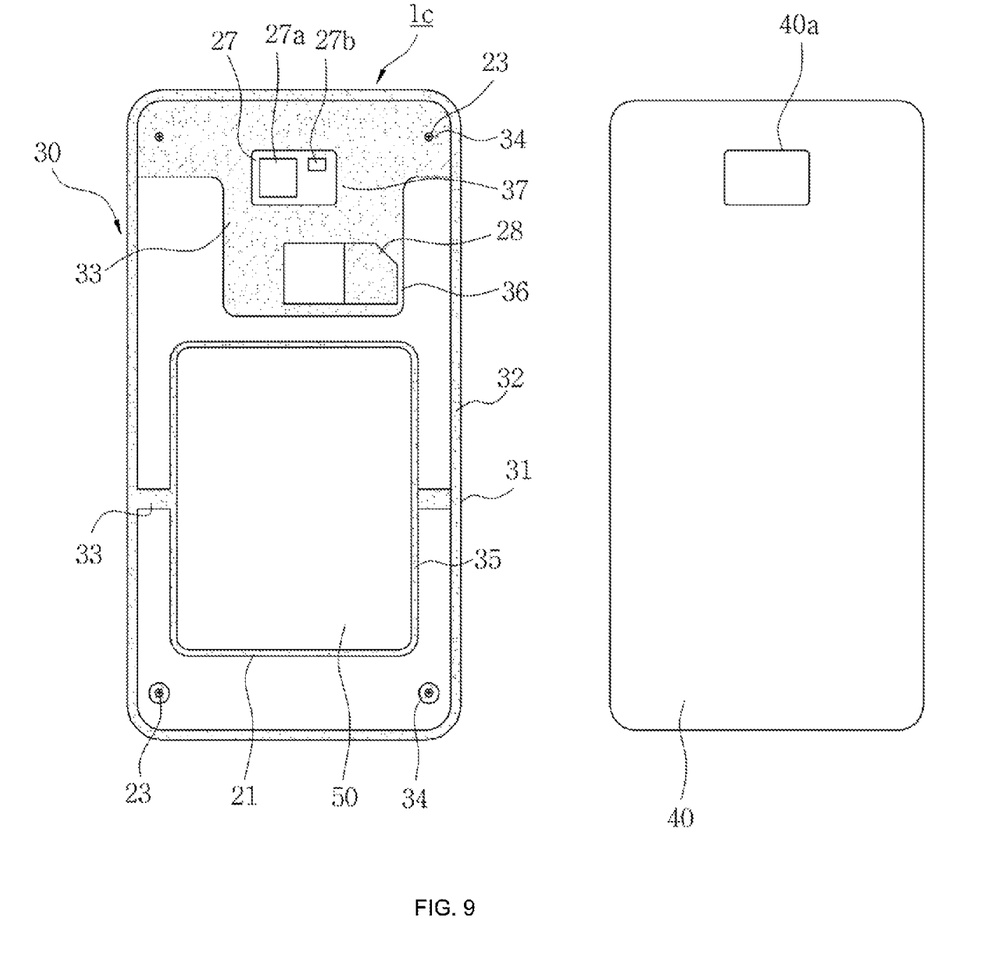
FIG. 9 is a bottom view exemplifying a mobile device in accordance with still another exemplary embodiment of the present invention in a state where the rear cover is detached.
Figure 10:
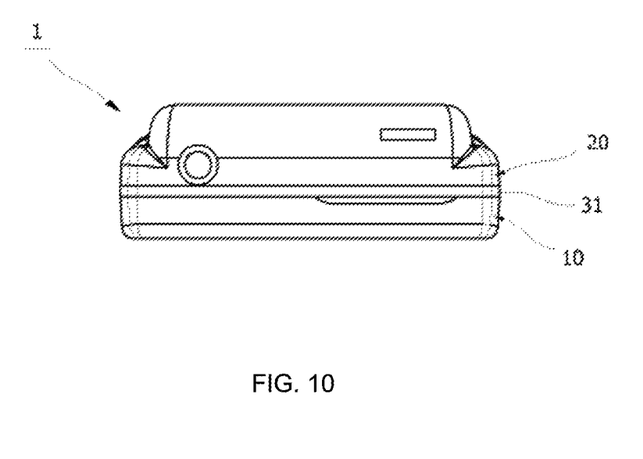
FIG. 10 is a top plan view of a conventional moisture-proofing mobile device.

In the exemplified embodiment, the concave part 21 for mounting a battery is formed on the outer surface of the bottom side of the bottom casing 20, and the battery cover 22 is mounted over the concave part 21. However, it shall be noted that the present invention includes an aspect in which such a battery cover 22 does not exist, and an aspect in which an antenna 28 or a camera part 27 is provided on the outer surface of the bottom side of the lower casing 20, as illustrated in FIGS. 7 to 9.

Protrusions 26 may be formed on the bottom side of the bottom casing 20 to prevent the bottom side of the bottom casing 20 from being scratched. The protrusions 26 may be formed to extend through the bottom side skin 33 or to be covered by the bottom side skin 33 on the top sides thereof.

Reference numeral 12 depicts a display window seating part.

FIGS. 5a and 5b illustrate an aspect in which the battery cover 22 with a fastening part 22a is mounted in the concave part 21 of the bottom casing 20, and a mounting groove 25, to which the fastening part 22a is fitted, is separately formed on the bottom casing 20, and the end of the fastening ridge 16 of the top casing 10 is formed as a convex part to compress the fastening part skin 31 integrally formed in the fastening groove 24 of the bottom casing 20. However, the outer surface of the fastening part skin 31 may be formed in various shapes, such as a convex shape, a concave shape, and a flat shape, and likewise, the end of the fastening ridge 16 of the top casing 10 may also be formed in various shapes, such as a concave shape, a convex shape, and a flat shape. These shapes are not limitative in the present invention, and may be optionally selected.

In FIGS. 5a and 5b, the screw hole skin 34 integrally formed in each of the screw seating parts 23a through dual injection molding is formed on the inner surface (i.e., inner circumferential surface) and the bottom surface of each of the screw seating parts 23a. The cover skin 35 is integrally formed on the inner surface of the concave part 21, specifically on the outer surface of the edges of the mounting groove 25, and an uplift part 35a is formed at the end of the cover skin to compress the fastening part 22a of the battery cover 22 so as to prevent the penetration of moisture.

Figure 6:
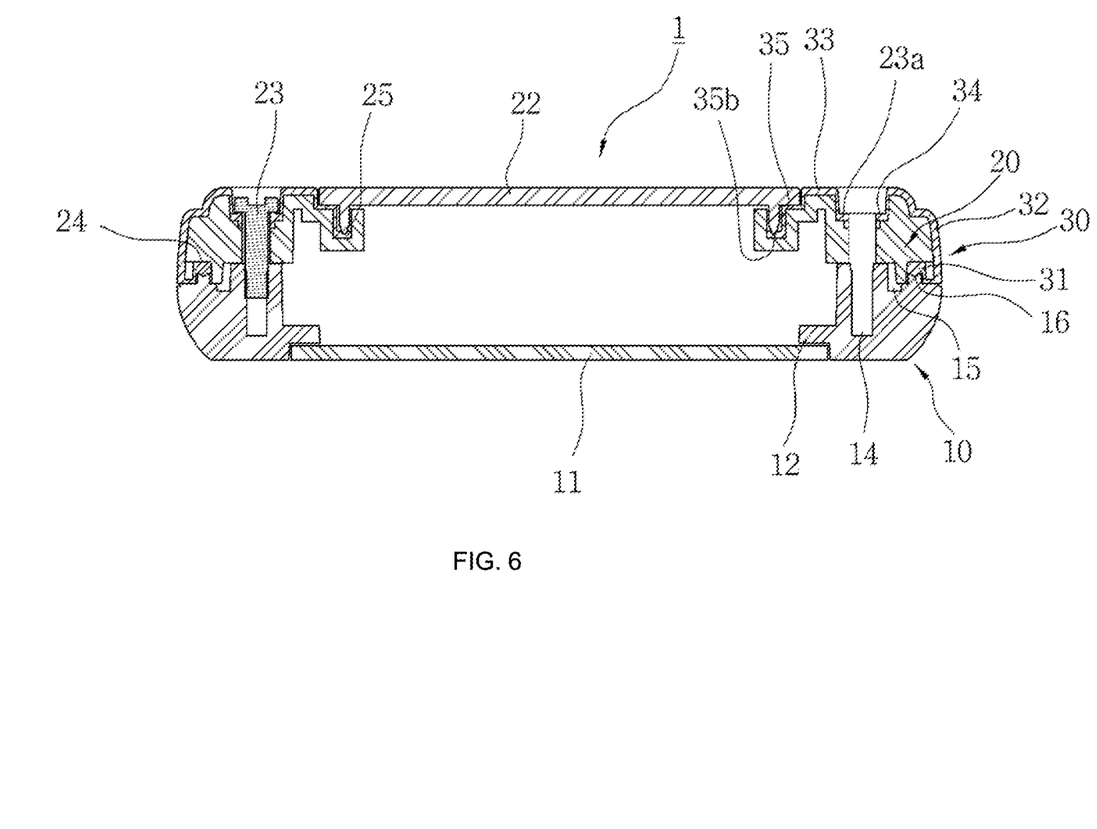
FIG. 6 is a schematic cross-sectional view illustrating a modified embodiment, which corresponds to FIG. 5b.

Now, referring to FIG. 6 which is a schematic cross-sectional view illustrating a modified embodiment of that illustrated in FIG. 5b, the basic construction of the modified embodiment is substantially identical to that of the exemplary embodiment of FIG. 5b. Therefore, only the difference therebetween will be described. The end of the fastening ridge 16 of the top casing 10 is formed in a concave shape, and the outer surface of the fastening skin 31 is formed in a convex shape. In addition, the screw hole skin 34 is formed over the inner surface and bottom surface of each of the screw seating parts 23a, and the top side inner surface of each of the screw holes (not designated by a reference numeral) to improve the moisture-proofing performance. Furthermore, the cover skin 35 is formed on the inner surface of the concave part 21, specifically formed to extend to the bottom surface of the mounting groove 25 through the outer surface of the edge of the mounting groove 25.

Referring to FIG. 7 which is a bottom view of a mobile device 1a in accordance with another exemplary embodiment of the present invention in a state where the rear cover 40 is detached, there is illustrated a typical smart phone, in which an antenna 28 and a camera part 27 are formed on the outer surface of the bottom side of the bottom casing (see the part designated by reference numeral 20 in FIG. 5a) in a state where the bottom casing is fastened to the top casing (see the part designated by reference numeral 10 in FIG. 5a), a battery 50 is mounted in a concave part 21 without a battery cover (see the part designated by reference numeral 22 in FIG. 5), and a thin rear cover 40, which is formed of a metal or a resin and formed with an opening 40a for exposing the camera part 27, is mounted on the outer surface of the bottom casing.

In the illustrated exemplary embodiment, a silicon skin 30, which includes a fastening part skin 31 (see FIGS. 5a and 5b), a lateral side skin 32, a bottom side skin 33, a screw hole skin 34, a cover skin 35, an antenna skin 36, and a camera skin 37, is integrally formed on the bottom casing (see reference numeral 20 in FIG. 5a) in a continued form by dual injection molding.

The camera skin 37 is formed to cover the outer peripheral edges of the camera part 27, which includes a lens 27a and a mirror 27b, to expose the camera part 27. The antenna skin 36 may be properly and selectively applied to cover only the outer peripheral edges of the antenna 28 or a part of a region including the outer peripheral edges, or to cover the entirety of the antenna 28. The antenna 28 may be formed through vapor deposition or printing, or may be injection-molded by insert molding as a separate metallic sheet piece. The present invention is not limited to any type of antenna.

In an embodiment of the present invention, the cover skin 35 is formed on the inner surface (i.e., inner peripheral edges) of the concave part 21 in which the battery 50 is mounted, and may include an outer region positioned adjacent to the inner peripheral edges of the concave part 21.

In the illustrated exemplary embodiment, the silicon skin 30 is divided or sectioned into the bottom side skin 33, the screw hole skin 34, the cover skin 35, the antenna skin 36, and the camera skin, without any specific meaning but merely for the convenience of description.

FIG. 8 illustrates a mobile device 1b in accordance with another exemplary embodiment of the present invention in a state where the rear cover 40 is detached. Since the construction of the mobile device 1b is substantially identical to that of the mobile device 1a shown in FIG. 7, only the different parts will be described. In the exemplary embodiment illustrated in FIG. 8, the lateral side skin 32 and the fastening part skin 31 are integrally and continuously formed. However, the screw hole skin 34, the cover skin 35, the antenna skin 36 and the camera skin 37 are discontinuously formed independently from each other, but are integrally formed with the bottom casing 20 through dual injection molding. There is not provided a separate bottom side skin (see reference numeral 33 in FIG. 7).

Finally, FIG. 8 illustrates a mobile device 1c in accordance with still another exemplary embodiment of the present invention in a state where the rear cover 40 is detached. Since the construction of the mobile device 1c is substantially identical to those shown in FIGS. 7 and 8, only the differences therebetween will be described. In the exemplary embodiment illustrated in FIG. 9, the lateral side skin 32 and the fastening part skin 31 are integrally and continuously formed, and some parts of the screw hole skins 34, the antenna skin 36, and the camera skin 37 are formed to be continuously connected to each other. However, some parts of the screw hole skins 34 and the cover skin 35 are formed independently from each other but are integrally formed with the bottom casing 20 through dual injection molding. The screw hole skins 34 and the cover skin 35 formed independently from each other are partially continuously formed to be connected to the lateral side skin 32 by some parts of the bottom side skin 33 which are partially formed.

When the antenna skin 36 is configured to cover a part of a region including the outer peripheral edges of the antenna 28 and to expose another part of the region of the antenna 28 as illustrated in the drawing, it is possible to minimize the deterioration of receiving sensitivity of the antenna.

Therefore, the provision of the bottom side skin 33, and the position and area of the region covered by the bottom side skin 33 are optional and selective for the present invention.

In the present invention, the top and bottom casings 10 and 20 may be formed of polycarbonate (PC), glass fiber-reinforced polycarbonate or epoxy, polyamine (PA), polypropylene (PP) or the like through injection molding. As the silicon skin 30 is fabricated integrally with the bottom housing 20 through the dual injection molding of silicon rubber, it is possible to provide a high reliability of moisture-proofing, and to provide excellent assemblability and high productivity due to the reduction of the number of components.

In addition, the dual injection-molded silicon skin 30, in particular the lateral side skin 32 can provide a sufficient impact resistance, and an excellent grip feeling.

The thickness of the silicon skin 30 may be in the range of 0.1 to 1.5 mm although it is not limitative, and the thickness of the lateral side skin 32 may be in the range of 0.5 to 1.5 mm in order to provide a sufficient impact resistance.

In addition, the silicon skin 30 may be formed in various colors. If desired, it is possible to form the lateral side skin 32, the bottom side skin 33, the screw hole skins 34, the cover skin 35, the antenna skin 36, and the camera skin 37 to have colors different from each other. Alternatively, it is also possible to provide various raised or depressed dot patterns, net patterns or the like on the surface of the silicon skin 30, which also belongs to the scope of the present invention.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A mobile device comprising:
   a top casing having a display window, one or more screw holes, a recess, and a fastening ridge;
   a bottom casing having a fastening groove engaged with the fastening ridge of the top casing, and a protrusion inserted into the recess, the bottom casing having an outer surface on which a concave part configured to mount a battery and one or more screw seating parts are formed;
   a silicon skin formed by a lateral side skin formed over four lateral sides of the bottom casing, a fastening part skin extending from the lateral side skin and formed in the fastening groove, a cover skin formed to cover at least the inner surfaces of the concave part and each of the one or more screw seating parts, the silicon skin being formed integrally with the bottom casing; and
   one or more clamping screws fastened to the one or more screw seating parts of the bottom casing and the screw holes of the top casing to fasten the top and bottom casings to each other.

2. The mobile device as claimed in claim 1, wherein a battery cover having a fastening part is mounted over the concave part of the bottom casing, the concave part of the bottom casing is formed with a mounting groove into which the fastening part of the battery cover is inserted.

3. The mobile device as claimed in claim 1, wherein the bottom casing is provided with an antenna on the outer surface thereof, and the silicon skin further comprises an antenna skin configured to integrally cover at least the outer peripheral edges of the antenna.

4. The mobile device as claimed in claim 1, wherein the bottom casing is provided with a camera part on the outer surface thereof, and the silicon skin further comprises a camera skin configured to integrally cover the outer peripheral edges of the camera part.

5. The mobile device as claimed in claim 1, further comprising a rear cover mounted on the outer surface of the bottom casing.

6. The mobile device as claimed in claim 1, wherein the silicon skin, which is formed by the lateral side skin, the fastening part skin, the cover skin, and the screw hole skins, is formed integrally and continuously, and covers the entirety of the outer surface of the bottom casing except the bottom surface of the concave part in which a battery is mounted.

7. The mobile device as claimed in claim 1, wherein the lateral side skin and the fastening part skin are integrally and continuously formed, but the cover skin and the screw hole skins are discontinuously and independently formed.

8. The mobile device as claimed in claim 1, wherein the outer surface of the fastening part skin is formed in a convex, concave or flat shape, and the end of the fastening ridge of the top casing is formed in a concave, convex or flat shape.

9. The mobile device as claimed in claim 2, wherein the cover skin configured to cover at least the inner surface of the concave part is formed with an uplift part to compress the fastening part of the battery cover.

* * * * *